(12) United States Patent
Bhatia et al.

(10) Patent No.: US 7,111,323 B1
(45) Date of Patent: Sep. 19, 2006

(54) METHOD AND APPARATUS TO FACILITATE A GLOBAL TIMEOUT IN A DISTRIBUTED COMPUTING ENVIRONMENT

(75) Inventors: Gaurav Bhatia, Foster City, CA (US); Kamalendu Biswas, Hayward, CA (US); Arun Swaminathan, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 870 days.

(21) Appl. No.: 10/072,089

(22) Filed: Feb. 8, 2002

Related U.S. Application Data

(60) Provisional application No. 60/316,808, filed on Aug. 31, 2001.

(51) Int. Cl.
G06F 7/04 (2006.01)
G06F 7/58 (2006.01)
G06F 7/00 (2006.01)
H04L 9/00 (2006.01)

(52) U.S. Cl. ............... 726/8; 726/9; 726/20; 707/9; 713/164

(58) Field of Classification Search ............... 713/200, 713/201, 202, 164; 707/9; 709/229; 726/8, 726/9, 20

See application file for complete search history.

(56) References Cited

U.S. PATENT DOCUMENTS 6,182,146 B1 * 1/2001 Graham-Cumming, Jr. . 709/238
2003/0012382 A1 * 1/2003 Ferchichi et al. ........... 380/270

* cited by examiner

*Primary Examiner*—Matthew Smithers
*Assistant Examiner*—Courtney Fields
(74) *Attorney, Agent, or Firm*—Park, Vaughan & Fleming LLP; Edward S. Grundler

(57) ABSTRACT

One embodiment of the present invention provides a system to facilitate global timeout in a distributed computing environment. The system operates by receiving an access request from a user at an application within the distributed computing environment. The system determines if the distributed computing environment has issued an authentication to a user device through which the user accesses the application and also determines if the authentication has expired because of non-use for a specified period. This authentication is stored within a time-stamped token on the user-device. If the authentication has not been received or has expired, the system redirects the access request to a single sign-on server for the distributed computing environment requiring the user to reauthenticate with the distributed computing environment, otherwise the system grants the user access to the application.

24 Claims, 3 Drawing Sheets

METHOD AND APPARATUS TO FACILITATE A GLOBAL TIMEOUT IN A DISTRIBUTED COMPUTING ENVIRONMENT

RELATED APPLICATION

This application hereby claims priority under 35 U.S.C. §119 to a Provisional Patent Application entitled, "Security Mechanisms in a Network Environment," filed Aug. 31, 2001 by inventors Arun Swaminathan, Kamalendu Biswas, and Gaurav Bhatia (Application No. 60/316,808).

BACKGROUND

1. Field of the Invention

The present invention relates to distributed computing environments. More specifically, the present invention relates to a method and an apparatus that facilitate a global timeout in a distributed computing environment.

2. Related Art

Computer applications within modem Enterprise computing systems are typically distributed across many application servers within the Enterprise with individual application servers hosting one or more applications. A user can access these applications across a network such as the Internet.

System designers have implemented many enhancements to these distributed computing environments to create a seamless integration of the various applications such as e-mail, task-lists, calendars, and the like. One such enhancement is a single sign-on for the distributed computing environment.

A single sign-on environment allows a user access to 'partner' applications across the distributed computing environment after authenticating once with a single sign-on server. These partner applications are ordinary computer applications, which have been grouped together by administrators of the distributed computing environment for the purpose of allowing the user to access them through the single sign-on server.

One problem in using a single sign-on server is that the individual applications implement their own application inactivity timers. This can lead to an application "timing-out" even though the user is active in another partner application. If the user subsequently wants to switch to the "timed-out" application, the user is redirected to the single sign-on server to be reauthenticated. Redirecting the user to the single sign-on server when the user has been active in a partner application creates a poor user experience because the partner applications do not exhibit a cohesive view to the user. If the user is currently accessing any of the partner applications, the user should have current access to all of the partner applications.

What is needed is a method and an apparatus that facilitates a single sign-on environment for partner applications in a distributed computing environment, which does not exhibit the drawbacks described above.

SUMMARY

One embodiment of the present invention provides a system that facilitates global timeout in a distributed computing environment. The system operates by receiving an access request from a user at an application within the distributed computing environment. In response to this request, the system determines if the distributed computing environment has issued an authentication to a user device through which the user accesses the application. The system also determines if the authentication has expired because of non-use for a specified period. This authentication is stored within a time-stamped token on the user device. If the authentication has not been received or has expired, the system redirects the access request to a single sign-on server for the distributed computing environment so that the user can reauthenticate with the distributed computing environment. Otherwise, the system grants the user access to the application.

In one embodiment of the present invention, the distributed computing environment includes multiple partner applications distributed across multiple network servers coupled to a public network.

In one embodiment of the present invention, the public network includes the Internet.

In one embodiment of the present invention, determining if the distributed computing environment has issued an authentication to the user involves first receiving an authentication credential from the user, verifying that the authentication credential is valid, and then providing a time-stamped token, which includes the authentication and a time, to the user-device.

In one embodiment of the present invention, determining if the authentication has expired because of non-use for a specified period involves first recovering the time-stamped token from the user-device, adding the specified period to the time within the time-stamped token to produce an expiry time, and detecting if a current time is later than the expiry time. If the current time is later than the expiry time, the authentication has expired.

In one embodiment of the present invention, the time within the time-stamped token is updated to the current time by a partner application when the partner application is accessed.

In one embodiment of the present invention, the time-stamped token is a domain cookie, which is accessible by multiple network servers within a domain on the public network.

In one embodiment of the present invention, the time-stamped token is encrypted and integrity checked to prevent attacks.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Systems

Figure 1:
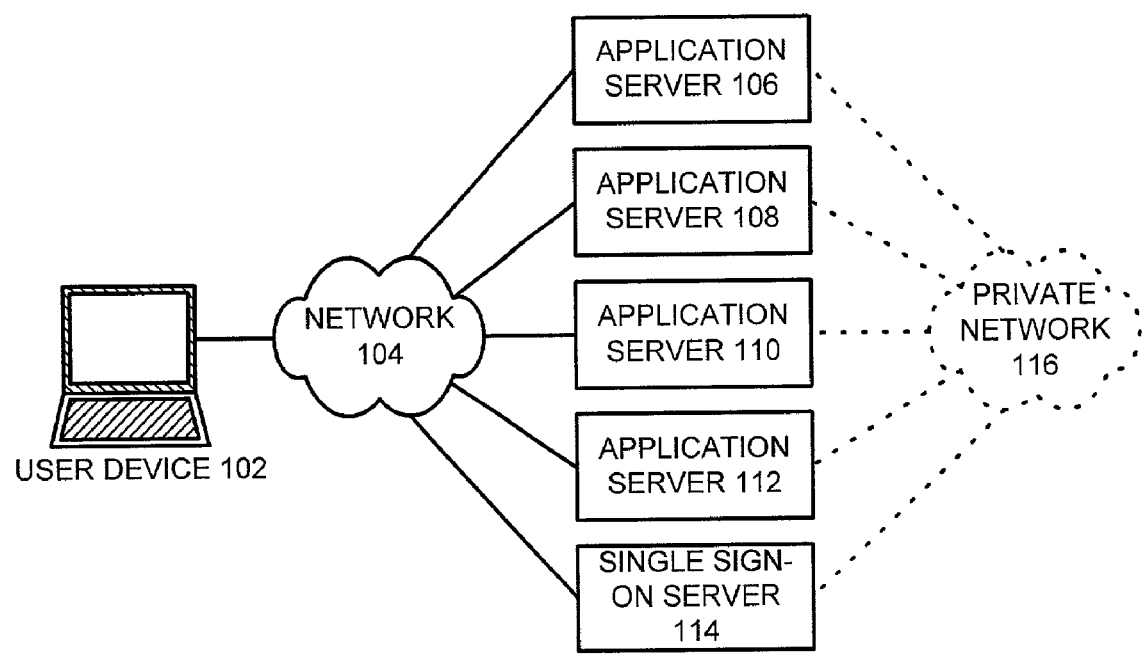
FIG. 1 illustrates computer systems coupled together in accordance with an embodiment of the present invention.

FIG. 1 illustrates computer systems coupled together in accordance with an embodiment of the present invention. These computer systems include user device 102, application servers 106, 108, 110, and 112, and single sign-on server 114 coupled together through network 104. Application servers 106, 108, 110, and 112, and single sign-on server 114 may optionally be coupled together through private network 116.

User device 102, application servers 106, 108, 110, and 112, and single sign-on server 114 can generally include any type of computer system, including, but not limited to, a computer system based on a microprocessor, a mainframe computer, a digital signal processor, a portable computing device, a personal organizer, a device controller, and a computational engine within an appliance. Note that the system may include more or less application servers than are shown in FIG. 1.

Network 104 can generally include any type of wire or wireless communication channel capable of coupling together computing nodes. This includes, but is not limited to, a local area network, a wide area network, or a combination of networks. In one embodiment of the present invention, network 104 includes the Internet.

Private network 116 can generally include any type of wire or wireless communication channel capable of coupling together computing nodes. This includes, but is not limited to, a local area network, a wide area network, or a combination of networks.

Application servers 106, 108, 110, and 112 provide partner applications to a user through user device 102. Multiple application servers are provided for load balancing, enhanced storage, separation of partner applications, and the like. Single sign-on server 114 controls access to these partner applications as described below in conjunction with FIG. 5. Users access the partner applications across network 104. When a user attempts to access a partner application on an application server, say application server 106, application server 106 determines if the user is currently authorized to access the application. If not, application server 106 redirects the access request to single sign-on server 114 so that the user's authorization credentials can be checked.

Application servers 106, 108, 110, and 112, and single sign-on server 114 can use private network 116, if provided, for private communications (e.g., for sharing a common time among the various servers). If private network 116 is not available, these private communications can be sent, possibly encrypted, through network 104.

Application Server

Figure 2:
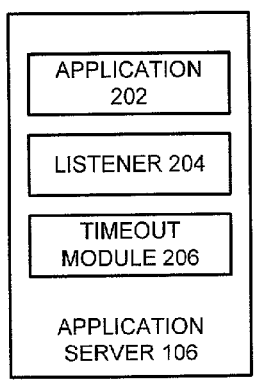
FIG. 2 illustrates application server 106 in accordance with an embodiment of the present invention.

FIG. 2 illustrates application server 106 in accordance with an embodiment of the present invention. Application server 106 is representative of the application servers coupled to the system and includes application 202, listener 204, and timeout module 206. Application servers 108, 110, 112, and other application servers included in the system are configured in a like manner.

Application 202 is a partner application within the distributed system and includes applications such as e-mail, database services, and the like. Note that application server 106 may include more than one application. Listener 204 monitors communications between user device 102 and application 202 within application server 106. When listener 204 detects an access request for application 202 from user device 102, listener 204 retrieves a time-stamped token from user device 102. Note that this time-stamped token is discussed further in conjunction with FIG. 5 below. The time-stamped token is passed to timeout module 206 to determine if user device 102 is currently authenticated to use application 202.

Timeout module 206 accepts this time-stamped token and adds a timeout value to the time within the time-stamped token to determine an expiry time. Timeout module 206 then determines if the current time is later than the expiry time. If so, the access request is redirected to the single sign-on server for authentication. Otherwise, timeout module 206 updates the time within the time-stamped token, returns the token to user device 102, and grants access to the application.

Single Sign-On Server

Figure 3:
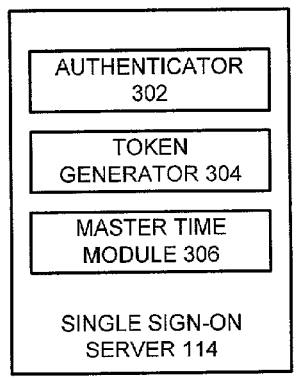
FIG. 3 illustrates single sign-on server 114 in accordance with an embodiment of the present invention.

FIG. 3 illustrates single sign-on server 114 in accordance with an embodiment of the present invention. Single sign-on server 114 includes authenticator 302, token generator 304, and master time module 306.

In operation, authenticator 302 validates the authentication credentials received from the user through user device 102. This authentication can be any type of authentication, which will validate the user and includes such techniques as user name/password and signed certificates. Authentication is well known in the art and will not be discussed further herein. Note that a single authentication is valid to allow the user access to the partner applications.

After authenticator 302 has validated the authentication credentials of the user, token generator 304 accesses master time module 306 for the current time. Next, token generator 304 creates a token to send to user device 102, which includes the current time. In one implementation of the present invention, this token is a cookie accessible from application servers within the same domain. The token may use cryptographic techniques to detect attempts to tamper with the token.

Timeout Module

Figure 4:
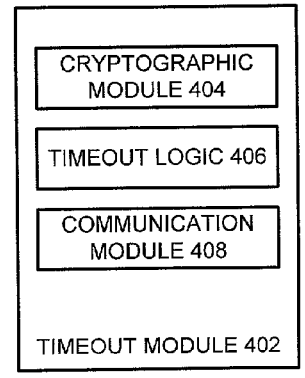
FIG. 4 illustrates timeout module 402 in accordance with an embodiment of the present invention.

FIG. 4 illustrates timeout module 402 in accordance with an embodiment of the present invention. Timeout module 402 includes cryptographic module 404, timeout logic 406, and communication module 408.

Communication module 408 communicates with user device 102 to receive the time-stamped token from user device 102 and return the updated time-stamped token to user device 102. This time-stamped token is used by timeout logic 406 to determine if the user has current access to the partner applications.

Cryptographic module 404 decrypts and authenticates the content of the time-stamped token using cryptographic techniques. These cryptographic techniques are well known in the art and will not be discussed further herein. Timeout logic 406 adds the timeout value to the time within the time-stamped token to create an expiry time. Timeout logic 406 then determines if the current time is later than the expiry time. If so, timeout logic 406 notifies listener 204 to redirect the access request to the single sign-on server. If the current time is not later than the expiry time, timeout logic 406 updates the time within the time-stamped token and returns it to user device 102 and then timeout logic 406 grants access to the application.

Accessing an Application

Figure 5:
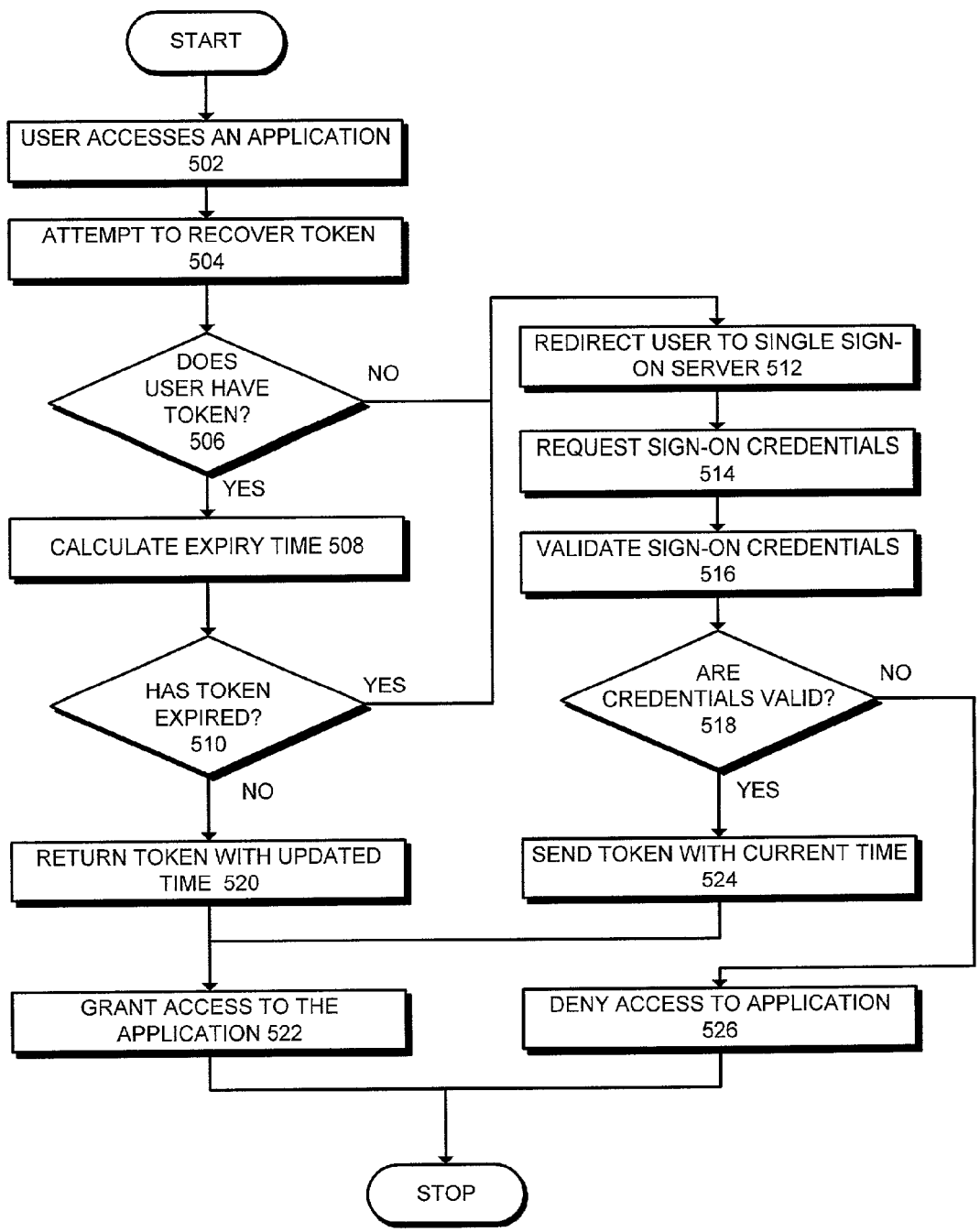
FIG. 5 is a flowchart illustrating the process of a user attempting to access an application in accordance with an embodiment of the present invention.

FIG. 5 is a flowchart illustrating the process of a user attempting to access an application in accordance with an embodiment of the present invention. The system starts when a user attempts to access a partner application, say application 202 on application server 106 (step 502). In response, listener 204 attempts to recover the time-stamped token from user device 102 (step 504). Next, listener 204 determines if a time-stamped token was received from user device 102 (step 506).

If listener 204 has received a time-stamped token from user device 102, timeout module 206 calculates an expiry time by adding a timeout value to the time within the time-stamped token (step 508). Next, timeout module determines if the token has expired by comparing the expiry time to the current time (step 510). If the current time is later than the expiry time, the token has expired.

If the user does not have a token at step 506 or if the token has expired at step 510, listener 204 redirects the access request to single sign-on server 114 (step 512). Next, authenticator 302 requests sign-on credentials from the user (step 514). Authenticator 302 then determines the validity of the sign-on credentials (step 516). If the credentials are not valid, authenticator 302 denies access to the application (step 526).

If the credentials are valid at step 518, token generator 304 sends a token including the current time to user device 102 (step 524). If the token has not expired at step 510, timeout module 206 returns the token with the time updated to the current time (step 520). Finally, timeout module 206 grants access to application 202 (step 522).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate global timeout in a distributed computing environment, comprising:
   receiving an access request from a user at an application in the distributed computing environment;
   determining if the distributed computing environment has issued an authentication to a user device through which the user accesses the application, wherein the authentication is stored within a time-stamped token on the user-device, and determining if the authentication has not expired by comparing an expiry time calculated from the time-stamped token against a current time; and
   if the authentication has not been received or has expired, redirecting the access request to a single sign-on server for the distributed computing environment;
   otherwise granting access to the application to the user.

2. The method of claim 1, wherein the distributed computing environment includes multiple partner applications distributed across multiple network servers coupled to a public network.

3. The method of claim 2, wherein the public network includes the Internet.

4. The method of claim 1, wherein determining if the distributed computing environment has issued the authentication to the user involves:
   receiving an authentication credential from the user;
   verifying that the authentication credential is valid; and
   providing the time-stamped token to the user-device, wherein the time-stamped token includes the authentication and a time.

5. The method of claim 4, wherein determining if the authentication has expired involves:
   recovering the time-stamped token from the user-device;
   adding the specified period to the time within the time-stamped token to produce the expiry time; and
   detecting if a current time is later than the expiry time, whereby if the current time is later than the expiry time, the authentication has expired.

6. The method of claim 5, wherein the time within the time-stamped token is updated to the current time by a partner application when the partner application is accessed.

7. The method of claim 4, wherein the time-stamped token is a domain cookie, wherein the domain cookie is accessible by multiple network servers within a domain on the public network.

8. The method of claim 4, wherein the time-stamped token is encrypted to prevent attacks.

9. A computer-readable storage medium storing instructions that when executed by a computer cause the computer to perform a method to facilitate global timeout in a distributed computing environment, wherein the computer readable storage medium includes one of a volatile memory and a non-volatile memory, the method comprising:
   receiving an access request from a user at an application in the distributed computing environment;
   determining if the distributed computing environment has issued an authentication to a user device through which the user accesses the application, wherein the authentication is stored within a time-stamped token on the user-11 device, and determining if the authentication has not expired by comparing an expiry time calculated from the time-stamped token against a current time; and
   if the authentication has not been received or has expired, redirecting the access request to a single sign-on server for the distributed computing environment;
   otherwise granting access to the application to the user.

10. The computer-readable storage medium of claim 9, wherein the distributed computing environment includes multiple partner applications distributed across multiple network servers coupled to a public network.

11. The computer-readable storage medium of claim 10, wherein the public network includes the Internet.

12. The computer-readable storage medium of claim 9, wherein determining if the distributed computing environment has issued the authentication to the user involves:
   receiving an authentication credential from the user;
   verifying that the authentication credential is valid; and
   providing the time-stamped token to the user-device, wherein the time-stamped token includes the authentication and a time.

13. The computer-readable storage medium of claim 12, wherein determining if the authentication has expired involves:
- recovering the time-stamped token from the user-device;
- adding the specified period to the time within the time-stamped token to produce the expiry time; and
- detecting if a current time is later than the expiry time, whereby if the current time is later than the expiry time, the authentication has expired.

14. The computer-readable storage medium of claim 13, wherein the time within the time-stamped token is updated to the current time by a partner application when the partner application is accessed.

15. The computer-readable storage medium of claim 12, wherein the time-stamped token is a domain cookie, wherein the domain cookie is accessible by multiple network servers within a domain on the public network.

16. The computer-readable storage medium of claim 12, wherein the time-stamped token is encrypted to prevent attacks.

17. An apparatus to facilitate global timeout in a distributed computing environment, comprising:
- a receiving mechanism that is configured to receive an access request from a user at an application in the distributed computing environment;
- a determining mechanism that is configured to determine if the distributed computing environment has issued an authentication to a user device through which the user accesses the application, wherein the authentication is stored within a time-stamped token on the user-device, and determine if the authentication has not expired by comparing an expiry time calculated from the time-stamped token against a current time; and
- a redirecting mechanism that is configured to redirect the access request to a single sign-on server for the distributed computing environment if the authentication has not been received or has expired.

18. The apparatus of claim 17, wherein the distributed computing environment includes multiple partner applications distributed across multiple network servers coupled to a public network.

19. The apparatus of claim 18, wherein the public network includes the Internet.

20. The apparatus of claim 17, wherein the receiving mechanism is further configured to receive an authentication credential from the user, the apparatus further comprising:
- a verifying mechanism that is configured to verify that the authentication credential is valid; and
- a time-stamp mechanism that is configured to provide the time-stamped token to the user-device, wherein the time-stamped token includes the authentication and a time.

21. The apparatus of claim 20, further comprising:
- a recovering mechanism that is configured to recover the time-stamped token from the user-device;
- an adding mechanism that is configured to add the specified period to the time within the time-stamped token to produce the expiry time; and
- a detecting mechanism that is configured to detect if a current time is later than the expiry time, whereby if the current time is later than the expiry time, the authentication has expired.

22. The apparatus of claim 21, wherein the time within the time-stamped token is updated to the current time by a partner application when the partner application is accessed.

23. The apparatus of claim 20, wherein the time-stamped token is a domain cookie, wherein the domain cookie is accessible by multiple network servers within a domain on the public network.

24. The apparatus of claim 20, wherein the time-stamped token is encrypted to prevent attacks.

* * * * *

UNITED STATES PATENT AND TRADEMARK OFFICE
CERTIFICATE OF CORRECTION

PATENT NO.        : 7,111,323 B1                                             Page 1 of 1
APPLICATION NO.   : 10/072089
DATED             : September 19, 2006
INVENTOR(S)       : Gaurav Bhatia et al.

It is certified that error appears in the above-identified patent and that said Letters Patent is hereby corrected as shown below:

In claim 9 (at column 6, line 45), please delete the phrase, "user-11 device" and replace with the phrase --user-device--.

Signed and Sealed this

Fifth Day of December, 2006

JON W. DUDAS
*Director of the United States Patent and Trademark Office*